May 15, 1934.  R. H. McKEE  1,958,439
RECOVERY OF ORGANIC CONSTITUENTS FROM BLACK LIQUOR
Filed Nov. 20, 1930
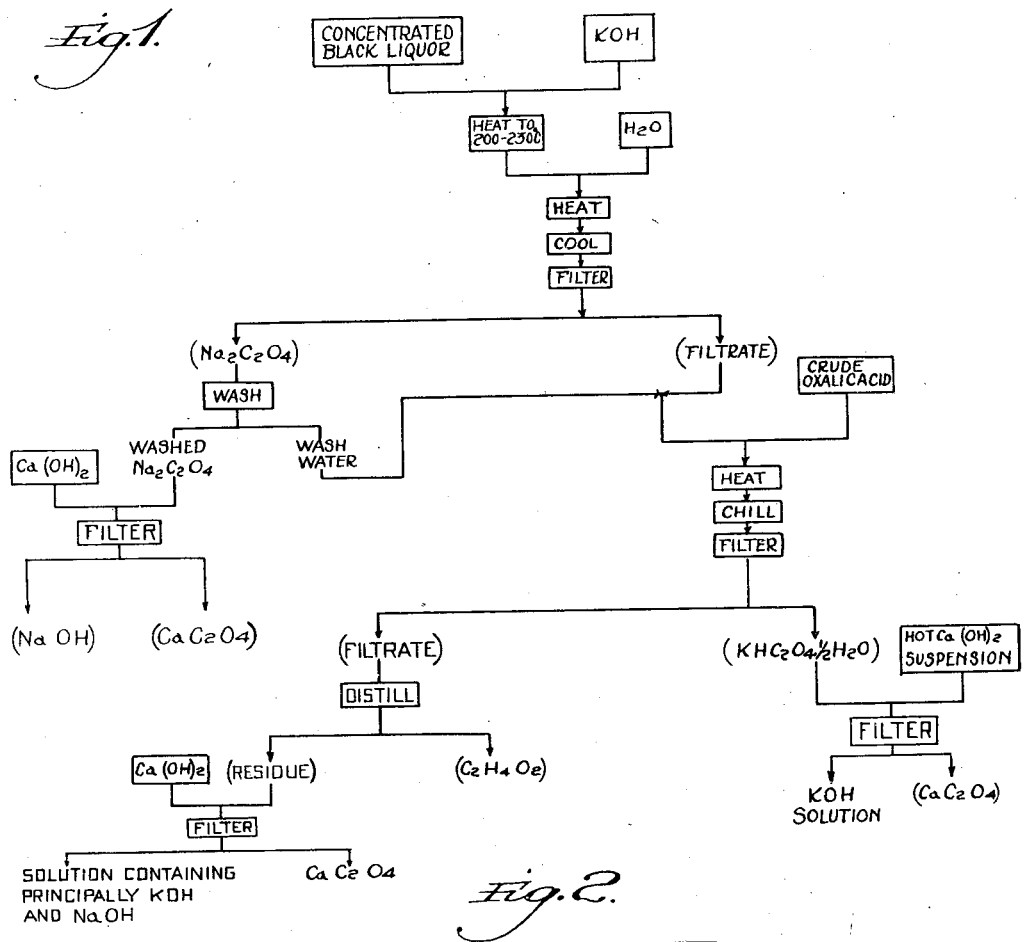
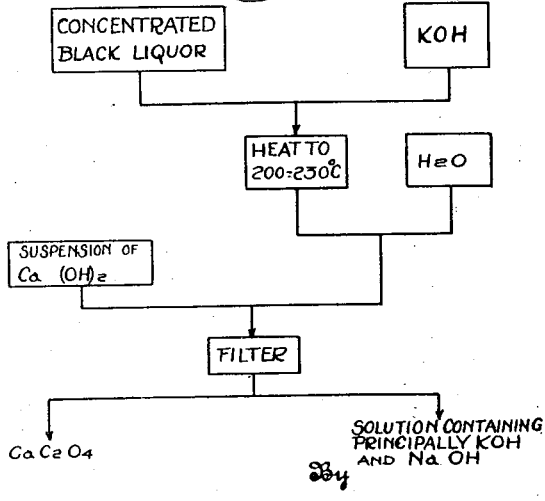
Inventor
RALPH H. MCKEE Patented May 15, 1934

1,958,439

UNITED STATES PATENT OFFICE 1,958,439

RECOVERY OF ORGANIC CONSTITUENTS FROM BLACK LIQUOR

Ralph H. McKee, Jersey City, N. J.

Application November 20, 1930, Serial No. 497,054

10 Claims. (Cl. 260—119)

This invention relates to the recovery of organic constituents present in black liquor obtained in making paper pulp by the caustic soda process, and more particularly to a process of recovering oxalic and acetic acids from black liquor.

The principal object of this invention is to provide an improved process of recovering organic constituents present in black liquor in merchantable form.

An important object of the invention is to provide a process of recovering oxalic and acetic acids from black liquor and at the same time recovering the sodium salts present in the black liquor in useful form.

Other objects and advantages of the invention will become apparent during the course of the following description.

According to the usual process of making paper pulp by the caustic soda method, wood chips, such as those from poplar, soft maple, birch, gum and similar woods, are heated in a digester with a solution of approximately 10% of caustic soda for some hours. Ordinarily this heating is carried out at a pressure of approximately 100 pounds per square inch, and at the corresponding temperature which is about 150° C. By this treatment the lignin present in the wood chips is dissolved and the cellulose fibers are left undissolved. These cellulose fibers are filtered off from the dark colored liquor which is commonly called "black liquor" in the industry and after being washed and bleached are ready for use in the manufacture of paper.

The black liquor contains in addition to the organic constituents removed from the wood chips, sodium salts. Several processes have been proposed for recovering these sodium salts. Ordinarily, the black liquors evaporated to approximately 50% solids and then burned in a short rotary kiln known in the industry as a black ash furnace. The residue as it comes from the black ash furnace consists essentially of sodium carbonate mixed with unburned carbon and a small amount of sodium silicate and other impurities. It is then leached with hot water. This hot solution of sodium carbonate carrying a small amount of sodium silicate is then causticized with lime and the resulting caustic soda solution filtered off and reused in the process. This caustic sode solution will contain about 10% of unchanged sodium carbonate calculated on the dry basis. The losses in the recovery of the caustic soda are due largely to volatilization during the burning and are normally 10 to 15%, and this much additional caustic soda must be added to the caustic solution recovered either in the form of sodium hydroxide or sodium carbonate.

As will be noted, the organic constituents present in the black liquor are lost in this treatment for the recovery of the caustic soda. Several processes have been proposed for the recovery of the organic constituents from the black liquor but hitherto in the art there has been no process available for recovering the organic constituents present in or capable of being formed from the black liquor, in merchantable form, without at the same time having a loss of the sodium salts in useless form.

The present process overcomes the disadvantages of the prior art processes in that in the practice of the process oxalic acid and acetic acid are obtained from the black liquor and at the same time the caustic soda present in the liquor is recovered as caustic soda and the caustic potash added during the process is recovered as caustic potash. In the preferred practice of the process the caustic soda and caustic potash are recovered separately and although they are not of complete purity they are of sufficient purity for commercial use. In contrast with the prior art processes, almost no alkali is lost in the present process.

In the practice of the present process the first steps of filtering off the cellulose fiber and evaporating the black liquor are the same as in the standard process. This concentrated black liquor contains from 50 to 60% by weight of solids calculated on the dry basis and about 40% of water.

The concentrated black liquor is mixed with crude caustic potash solid or solution and the mass is heated at a temperature of approximately 200 to 230° C. for about two hours. During this treatment the mass is stirred. Considerable quantities of the alkali salts of oxalic acid and acetic acid are produced from the organic material present in the original black liquor during this heating treatment. The yield of oxalic acid ($H_2C_2O_4.2H_2O$) calculated on the organic material present in the original black liquor is approximately 85% by weight and the yield of acetic acid is approximately 12% by weight so that the total yield by weight of useful acids is approximately 100% calculated on the weight of the organic material present in the black liquor.

These acids are, of course, present in the fused melt produced by the heat treatment in the form of their alkali salts and it is necessary to recover these acids from the salts with the simultaneous recovery of the alkalies in useful form. The present process depends upon the fact that sodium oxalate ($Na_2C_2O_4$) is only slightly soluble in cold water and still less soluble in an alkaline solution of potassium oxalate. This permits of the recovery of the sodium in the form of sodium oxalate quite completely. While potassium oxalate is quite soluble, the acid potassium oxalate ($KHC_2O_4 \cdot \frac{1}{2}H_2O$) is only slightly soluble and accordingly by adding oxalic acid to the filtrate from the sodium oxalate, it is possible to precipitate both the potash and the oxalate which have been added, as well as the residual oxalate present in the melt, as the acid oxalate $$(KHC_2O_4 \cdot \tfrac{1}{2}H_2O).$$

The acetic acid together with a small amount of oxalate will pass into the filtrate and by distilling the filtrate can be recovered as dilute acetic acid, and the residual oxalic acid can be recovered from the residue as calcium oxalate by the addition of lime. The calcium oxalate is filtered off and the filtrate which contains principally caustic soda and caustic potash may be concentrated and used in the cooking of the next digester of wood chips. It is somewhat colored but not enough to be objectionable for this use.

According to a specific embodiment of the process, a flow sheet of which is shown in Figure 1 of the accompanying drawing, 1000 parts by weight of the concentrated black liquor are mixed with from 900 to 1000 parts of crude caustic potash calculated as if on the dry basis. The mass is heated, water being at first evolved but later a nearly dry fused mass remains. This is maintained at a temperature of approximately 200 to 230° C., preferably at about 220° C., for about two hours, the higher the temperature the shorter the time. During this fusion the mass is stirred in any suitable manner. To the resulting mass are added approximately 1000 parts by weight of water and the resulting mixture boiled up, and thereafter allowed to cool. Upon cooling, crystals of sodium oxalate ($Na_2C_2O_4$) precipitate and these crystals are filtered off. The crystals removed by filtration are washed with approximately 500 parts of water, preferably in portions. The remaining damp sodium oxalate is then treated with slightly more than the calculated amount of slaked lime which results in the formation of caustic soda and calcium oxalate. The calcium oxalate ($CaC_2O_4$) which precipitates is filtered off. The filtrate is recovered and used as a caustic soda solution for pulp making. The precipitate of calcium oxalate is either sold directly as calcium oxalate or recovered in the form of oxalic acid by treatment with sulfuric acid and used in part at a later step in the process or recrystallized by the methods customary in the art by which oxalic acid is made from calcium oxalate.

To the filtrate remaining after the removal of the sodium oxalate crystals, together with the wash waters from the washing of the sodium oxalate crystals, there are added approximately 2000 parts of crude oxalic acid. The resulting mass is heated to approximately the boiling point of water and thereafter the heated mass is chilled, as with ice or ice water. Upon chilling, potassium acid oxalate ($KHC_2O_4 \cdot \frac{1}{2}H_2O$) separates and is filtered off. The filtered potassium acid oxalate is treated with slightly more than the calculated amount of hot calcium hydroxide suspension; this gives the oxalic acid in the form of a calcium oxalate precipitate and the alkali present as a strong crude caustic potash solution, say 15% in strength.

The filtrate from the potassium acid oxalate is distilled in conventional manner and the distillate carries acetic acid. The residue remaining after the removal of acetic acid by the distillation is treated with an excess of calcium hydroxide suspension and any oxalic acid present is thereby precipitated as calcium oxalate. The calcium oxalate is recovered by filtration and the filtrate may be used after concentration in the making of paper pulp. While it is somewhat colored it is not enough so to be objectionable for this use.

As noted above, and as is readily apparent from the flow sheet in Figure 1, calcium oxalate is produced at three points in the process. The calcium oxalate precipitates may be sold as calcium oxalate but it is preferred to work up the oxalate by the customary manner employed in the art by means of sulfuric acid and recrystallization to give commercial grades of oxalic acid, particularly as crude oxalic acid is used in the process.

The acetic acid produced by the distillation of the filtrate from the potassium acid oxalate may be disposed of as desired.

From the foregoing it is apparent that substantially quantitative yields of oxalic acid and acetic acid are obtained by the practice of the process and that the caustic soda originally present is substantially completely recovered as such for further use in the pulp making process. Further, the caustic potash added in the process is recovered and is available for reuse in the process.

In the event that the caustic alkali recovered from the black liquor is to be used in making a grade of paper in which a small amount of color is not objectionable, it may be found more economical to modify the preferred process as described above by dissolving the original melt obtained by heating the evaporated black liquor with caustic potash in water and treating the resulting solution with a suspension of calcium hydroxide, thereby precipitating all the oxalic acid present as calcium oxalate and leaving, after the removal of the calcium oxalate by filtration, a mixture of potassium hydroxide, sodium hydroxide and a small amount of potassium and sodium acetates in the filtrate. A flow sheet of such a procedure is shown in Figure 2 of the accompanying drawing. The caustic solution produced is somewhat colored by dissolved residual organic material, generally to the extent of about 3% as much color as the original black liquor. However, unlike that made by the processes commonly in use at the present time, this solution has the advantage that it is low in alkali carbonates due to the fact that in the solution before causticizing the major quantity of the alkali present was in the form of oxalate instead of as carbonate.

In the event that only a portion of this alkali solution is used for cooking another lot of wood chips in a digester, the portion not used for this purpose is preferably evaporated in an evaporator of the ordinary type to give a strong caustic alkali solution to be used again in the process for addition to the concentrated black liquor just before it is heated at a temperature of from 200 to 230° C., for about two hours, as described.

If substantially all of the alkali solution is used for cooking another lot of wood chips in the digester, the black liquor obtained will contain enough caustic potash so that the step of adding caustic potash to the concentrated black liquor before heating to about 200 to 230° C., as described, may advantageously be omitted in the further practice of the process. Thus, after the caustic potash has been introduced into the system further amounts need not be used in the further operation of the process except such small amounts as may have to be added from time to time to make up for mechanical losses. This saving in operation compensates for the loss of acetic acid which is not recovered in operating by this procedure.

While it is old to make oxalic acid by heating forms of cellulose such as sawdust with a mixture of caustic potash and caustic soda, such prior processes do not possess the advantages of the present process. For example, the hours of heating required in an oxalic acid plant are many more than those indicated in applicant's process. Moreover, the yields in such prior processes have a maximum of approximately 50% of the organic material (sawdust) taken. In the present process the yields of oxalic acid run as high as 90% of the weight of the organic material taken. All yields mentioned refer to weight on the dry basis but the oxalic acid is calculated as $H_2C_2O_4.2H_2O$, that is, with two molecules of water of crystallization.

It is to be understood that in the subjoined claims references as to weight of black liquor and caustic potash in each case refer to anhydrous materials, i. e. the weights of such materials are calculated on a dry basis.

While I have described in detail the preferred embodiment of my invention it is to be understood that the details of procedure may be widely varied without departing from the spirit of the invention or the scope of the subjoined claims.

I claim:

1. The process which comprises heating concentrated black liquor with caustic potash, dissolving the resulting mass in water, treating the resulting solution to crystallize out sodium oxalate, filtering off the sodium oxalate, treating the filtrate with oxalic acid to form potassium acid oxalate and recovering potassium acid oxalate from such solution.

2. The process which comprises heating concentrated black liquor with caustic potash, dissolving the resulting mass in water, treating the resulting solution to crystallize out sodium oxalate, filtering off the sodium oxalate, treating the filtrate with oxalic acid to form potassium acid oxalate, recovering potassium acid oxalate from such solution, reacting upon the potassium acid oxalate with calcium hydroxide to form calcium oxalate and caustic potash.

3. The process which comprises heating concentrated black liquor with caustic potash, dissolving the resulting mass in water, crystallizing out from such solution sodium oxalate, filtering off the sodium oxalate, treating the filtrate with oxalic acid, crystallizing out potassium acid oxalate from such solution, treating the potassium oxalate with a hot calcium hydroxide suspension, and filtering off the calcium oxalate formed.

4. The process which comprises fusing concentrated black liquor with caustic potash by heating to approximately 200 to 230° C. for about two hours, dissolving the fused mass in water, heating the resulting solution to dissolve the sodium oxalate present, cooling the solution to crystallize out sodium oxalate, filtering off the sodium oxalate, treating the filtrate with crude oxalic acid, heating the resulting solution to dissolve the potassium acid oxalate formed, chilling the solution to crystallize out the potassium acid oxalate, filtering off the potassium acid oxalate, reacting upon the potassium acid oxalate with a hot suspension of calcium hydroxide to form calcium oxalate and caustic potash, and filtering out the calcium oxalate.

5. The process which comprises heating concentrated black liquor with caustic potash, dissolving the resulting mass in water, separating by crystallization the sodium oxalate present in such solution, filtering off the sodium oxalate, treating the filtrate with oxalic acid, separating potassium acid oxalate by filtration, and distilling the filtrate to recover acetic acid.

6. The process which comprises heating concentrated black liquor with caustic potash, dissolving the resulting mass in water, separating by crystallization the sodium oxalate present in such solution, filtering off the sodium oxalate, treating the filtrate with oxalic acid, separating potassium acid oxalate by filtration, distilling the filtrate to recover acetic acid and reacting upon the residue with calcium hydroxide to form calcium oxalate.

7. The process of recovering the oxalic acid content of a solution containing sodium oxalate and potassium oxalate which comprises cooling the solution to crystallize out the sodium oxalate, treating the remaining solution with oxalic acid to convert the potassium oxalate into potassium acid oxalate, and crystallizing out the potassium acid oxalate by cooling the solution.

8. The process which comprises heating concentrated black liquor with caustic potash, dissolving the resulting mass in water, crystallizing out sodium oxalate by cooling the solution, treating the remaining solution with oxalic acid to convert the potassium oxalate into potassium acid oxalate, and crystallizing out the potassium acid oxalate.

9. The process which comprises heating concentrated black liquor with caustic potash, dissolving the resulting mass in water, crystallizing out sodium oxalate by cooling the solution, treating the remaining solution with oxalic acid to convert the potassium oxalate into potassium acid oxalate, crystallizing out the potassium acid oxalate by cooling the solution, and distilling the remaining solution to recover acetic acid therefrom.

10. The process which comprises fusing concentrated black liquor with caustic potash by heating to a temperature of approximately 200 to 230° C. for about two hours, dissolving the fused mass in water, boiling the resulting solution, cooling the solution to crystallize out the sodium oxalate present, filtering off the sodium oxalate, washing the sodium oxalate with water, reacting the washed sodium oxalate with calcium hydroxide, filtering the resulting solution to recover calcium oxalate and a solution of sodium hydroxide, treating the filtrate remaining after the removal of sodium oxalate crystals with crude oxalic acid, heating the resulting solution to approximately the boiling point of water, chilling the resulting solution to crystallize out potassium acid oxalate, treating the crystals of potassium acid oxalate with a hot suspension of calcium hydroxide, separating by filtration the calcium oxalate formed from the caustic potash solution, distilling the filtrate remaining after the removal of potassium acid oxalate to recover acetic acid therefrom, and treating the residue with calcium hydroxide to form calcium oxalate.  RALPH H. McKEE.